(12) United States Patent  
Silverbrook

(10) Patent No.: US 8,285,137 B2  
(45) Date of Patent: *Oct. 9, 2012

(54) DIGITAL CAMERA SYSTEM FOR SIMULTANEOUS PRINTING AND MAGNETIC RECORDING

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/117,099

(22) Filed: May 26, 2011

(65) Prior Publication Data

US 2011/0228026 A1   Sep. 22, 2011

Related U.S. Application Data

(63) Continuation of application No. 12/818,138, filed on Jun. 17, 2010, now Pat. No. 7,970,275, which is a continuation of application No. 12/542,606, filed on Aug. 17, 2009, now Pat. No. 7,742,696, which is a continuation of application No. 11/951,960, filed on Dec. 6, 2007, now Pat. No. 7,590,347, which is a continuation of application No. 11/190,902, filed on Jul. 28, 2005, now Pat. No. 7,558,476, which is a continuation of application No. 10/176,680, filed on Jun. 24, 2002, now Pat. No. 6,985,207, which is a continuation-in-part of application No. 09/112,788, filed on Jul. 10, 1998, now abandoned.

(30) Foreign Application Priority Data

Jul. 15, 1997 (AU) .......................... PO7991  
Sep. 23, 1997 (AU) .......................... PO9402

(51) Int. Cl.  
*G03B 17/24* (2006.01)

(52) U.S. Cl. ........................................ 396/312; 396/319

(58) Field of Classification Search ................... 396/14, 396/30, 33, 310, 312, 315, 319; 348/207.2; 355/18, 31, 72; 358/296; 346/140.1; 347/48; 360/3

See application file for complete search history.

(56) References Cited

U.S. PATENT DOCUMENTS 3,573,437 A   4/1971   Scuitto et al.  
3,663,801 A   5/1972   Wahli et al.

(Continued)

FOREIGN PATENT DOCUMENTS

AU   96-4449186   8/1996

(Continued)

OTHER PUBLICATIONS

"Suppliers Focus on Teens", Chain Drug Review, Oct. 9, 2000, vol. 22, No. 17, p. 30, entire document.

(Continued)

*Primary Examiner* — W. B. Perkey

(57) ABSTRACT

A digital camera system includes a print medium having a first surface delimiting an area in which images are printed, and a second surface pre-treated to be magnetically sensitive; a photo-width printhead integrated with a digital camera, the photo-width printhead for printing digital images on the first surface of the print medium; and a magnetic recorder for recording information associated with said digital images on the second surface of the print medium at the same time the printhead prints the digital images onto the printing area.

4 Claims, 4 Drawing Sheets

U.S. PATENT DOCUMENTS

| | | |
|---|---|---|
| 3,701,098 A | 10/1972 | Acker |
| 3,731,062 A | 5/1973 | Reilly, Jr. |
| 3,735,350 A | 5/1973 | Lemelson |
| 3,737,629 A | 6/1973 | See |
| 3,748,939 A | 7/1973 | Feinstein et al. |
| 3,760,162 A | 9/1973 | Holter |
| 3,778,541 A | 12/1973 | Bowker |
| 3,852,572 A | 12/1974 | Nicould |
| 3,857,019 A | 12/1974 | Holtey |
| 3,866,217 A | 2/1975 | Bennett, Jr. |
| 3,893,173 A | 7/1975 | Taggart et al. |
| 3,896,691 A | 7/1975 | Granger et al. |
| 3,916,420 A | 10/1975 | Brown et al. |
| 3,943,563 A | 3/1976 | Lemelson |
| 3,970,803 A | 7/1976 | Kinzie, Jr. et al. |
| 4,000,239 A | 12/1976 | Hamana et al. |
| 4,048,617 A | 9/1977 | Neff |
| 4,088,981 A | 5/1978 | Gott |
| 4,092,654 A | 5/1978 | Alasia |
| 4,161,749 A | 7/1979 | Erlichman |
| 4,173,401 A | 11/1979 | Harvey |
| 4,200,867 A | 4/1980 | Hill |
| 4,213,694 A | 7/1980 | Kuseski |
| 4,234,214 A | 11/1980 | Lee |
| 4,244,006 A | 1/1981 | Kitahara et al. |
| 4,253,476 A | 3/1981 | Sato |
| 4,262,284 A | 4/1981 | Stieff et al. |
| 4,270,853 A | 6/1981 | Hatada et al. |
| 4,402,150 A | 9/1983 | Sullivan |
| 4,414,316 A | 11/1983 | Conley |
| 4,429,320 A | 1/1984 | Hattori et al. |
| 4,454,517 A | 6/1984 | Kagaya |
| 4,455,609 A | 6/1984 | Inamura et al. |
| 4,463,359 A | 7/1984 | Ayata et al. |
| 4,488,563 A | 12/1984 | Morifuji et al. |
| 4,494,862 A | 1/1985 | Tanaka |
| 4,494,864 A | 1/1985 | Smith et al. |
| 4,500,183 A | 2/1985 | Tanikawa |
| 4,500,919 A | 2/1985 | Shreiber |
| 4,511,907 A | 4/1985 | Fukuchi |
| 4,518,235 A | 5/1985 | Reed et al. |
| 4,534,142 A | 8/1985 | Drefahl |
| 4,546,434 A | 10/1985 | Gioello |
| 4,558,326 A | 12/1985 | Kimura et al. |
| 4,580,721 A | 4/1986 | Coffee et al. |
| 4,581,710 A | 4/1986 | Hasslemeier |
| 4,592,938 A | 6/1986 | Benoit |
| 4,596,039 A | 6/1986 | Mitchell et al. |
| 4,632,585 A | 12/1986 | Oyamatsu et al. |
| 4,639,738 A | 1/1987 | Young et al. |
| 4,640,529 A | 2/1987 | Katz |
| 4,641,980 A | 2/1987 | Matsumoto |
| 4,652,935 A | 3/1987 | Endoh et al. |
| 4,665,556 A | 5/1987 | Fukushima et al. |
| 4,683,477 A | 7/1987 | Braun et al. |
| 4,688,105 A | 8/1987 | Bloch et al. |
| 4,689,642 A | 8/1987 | Sugitani |
| 4,689,683 A | 8/1987 | Efron |
| 4,692,394 A | 9/1987 | Drexler |
| 4,703,332 A | 10/1987 | Crotti et al. |
| 4,707,713 A | 11/1987 | Ayata et al. |
| 4,724,307 A | 2/1988 | Dutton et al. |
| 4,728,978 A | 3/1988 | Inoue et al. |
| 4,740,269 A | 4/1988 | Berger et al. |
| 4,754,487 A | 6/1988 | Newmuis |
| 4,762,986 A | 8/1988 | Suda et al. |
| 4,771,342 A | 9/1988 | Beesley |
| 4,783,700 A | 11/1988 | Nagane |
| 4,783,823 A | 11/1988 | Tasaki et al. |
| 4,788,563 A | 11/1988 | Omo et al. |
| 4,791,443 A | 12/1988 | Foley et al. |
| 4,796,038 A | 1/1989 | Allen et al. |
| 4,819,395 A | 4/1989 | Sugita et al. |
| 4,833,599 A | 5/1989 | Colwell et al. |
| 4,835,388 A | 5/1989 | Bruml et al. |
| 4,837,628 A | 6/1989 | Sasaki |
| 4,845,770 A | 7/1989 | Koshida |
| 4,853,967 A | 8/1989 | Mandeville |
| 4,860,375 A | 8/1989 | McCubbrey et al. |
| 4,861,031 A | 8/1989 | Simms |
| 4,868,676 A | 9/1989 | Matsuura et al. |
| 4,897,719 A | 1/1990 | Griffin |
| 4,897,724 A | 1/1990 | Veldhuis |
| 4,902,880 A | 2/1990 | Garczynski et al. |
| 4,904,100 A | 2/1990 | Enix |
| 4,914,452 A | 4/1990 | Fukawa |
| 4,937,676 A | 6/1990 | Finelli et al. |
| 4,949,189 A | 8/1990 | Ohmori |
| 4,954,910 A | 9/1990 | Ueno |
| 4,965,596 A | 10/1990 | Nagoshi et al. |
| 4,975,969 A | 12/1990 | Tal |
| 4,977,459 A | 12/1990 | Ebinuma et al. |
| 4,983,996 A | 1/1991 | Kinoshita |
| 4,987,030 A | 1/1991 | Saito et al. |
| 4,991,205 A | 2/1991 | Lemelson |
| 4,993,405 A | 2/1991 | Takamura et al. |
| 4,999,647 A | 3/1991 | Wood et al. |
| 5,005,998 A | 4/1991 | Takanashi et al. |
| 5,009,626 A | 4/1991 | Katz |
| 5,016,112 A | 5/1991 | Nakajima et al. |
| 5,018,072 A | 5/1991 | Ibamoto et al. |
| 5,021,892 A | 6/1991 | Kita et al. |
| 5,031,049 A | 7/1991 | Toyama et al. |
| 5,035,325 A | 7/1991 | Kitsuki |
| 5,035,929 A | 7/1991 | Myers |
| 5,036,472 A | 7/1991 | Buckley et al. |
| 5,043,748 A | 8/1991 | Katayama et al. |
| 5,049,898 A | 9/1991 | Arthur et al. |
| 5,053,814 A | 10/1991 | Takano et al. |
| 5,058,856 A | 10/1991 | Gordon et al. |
| 5,091,966 A | 2/1992 | Bloomberg et al. |
| 5,101,096 A | 3/1992 | Ohyama et al. |
| 5,103,311 A | 4/1992 | Sluijter et al. |
| 5,107,290 A | 4/1992 | Ohsawa |
| 5,111,288 A | 5/1992 | Blackshear |
| 5,115,888 A | 5/1992 | Schneider |
| 5,119,115 A | 6/1992 | Buat et al. |
| 5,121,139 A | 6/1992 | Burke |
| 5,121,349 A | 6/1992 | Naito |
| 5,124,692 A | 6/1992 | Sasson |
| 5,132,798 A | 7/1992 | Yoshimura et al. |
| 5,134,495 A | 7/1992 | Frazier et al. |
| 5,138,459 A | 8/1992 | Roberts et al. |
| 5,148,534 A | 9/1992 | Comerford |
| 5,151,726 A | 9/1992 | Iwashita et al. |
| 5,153,532 A | 10/1992 | Albers et al. |
| 5,154,956 A | 10/1992 | Fradrich |
| 5,160,577 A | 11/1992 | Deshpande |
| 5,164,827 A | 11/1992 | Paff |
| 5,172,423 A | 12/1992 | France |
| 5,175,808 A | 12/1992 | Sayre |
| 5,179,389 A | 1/1993 | Arai et al. |
| 5,182,548 A | 1/1993 | Haeberli |
| 5,184,169 A | 2/1993 | Nishitani |
| 5,191,640 A | 3/1993 | Plass |
| 5,204,944 A | 4/1993 | Wolberg et al. |
| 5,206,919 A | 4/1993 | Keating |
| 5,208,610 A | 5/1993 | Su et al. |
| 5,216,490 A | 6/1993 | Greiff et al. |
| 5,220,352 A | 6/1993 | Yamamoto et al. |
| 5,220,400 A | 6/1993 | Anderson et al. |
| 5,221,833 A | 6/1993 | Hecht |
| 5,224,179 A | 6/1993 | Denker et al. |
| 5,235,428 A | 8/1993 | Hirota et al. |
| 5,239,292 A | 8/1993 | Willan |
| 5,241,165 A | 8/1993 | Drexler |
| 5,241,372 A | 8/1993 | Ohba |
| 5,243,174 A | 9/1993 | Veeneman et al. |
| 5,243,370 A | 9/1993 | Slater |
| 5,243,381 A | 9/1993 | Hube |
| 5,245,365 A | 9/1993 | Woodard et al. |
| 5,247,611 A | 9/1993 | Norden-Paul et al. |
| 5,260,735 A | 11/1993 | Ishikawa et al. |
| 5,266,781 A | 11/1993 | Warwick et al. |
| 5,275,877 A | 1/1994 | Isayev |
| 5,276,472 A | 1/1994 | Bell et al. |
| 5,278,608 A | 1/1994 | Taylor et al. |

| Patent No. | Kind | Date | Inventor(s) |
|---|---|---|---|
| 5,280,160 | A | 1/1994 | Yamamoto et al. |
| 5,282,044 | A | 1/1994 | Misawa et al. |
| 5,282,051 | A | 1/1994 | Walker |
| 5,288,980 | A | 2/1994 | Patel et al. |
| 5,301,043 | A | 4/1994 | Ichikawa |
| 5,315,316 | A | 5/1994 | Khormaee |
| 5,317,146 | A | 5/1994 | Isobe |
| 5,318,370 | A | 6/1994 | Nehowig |
| 5,327,260 | A | 7/1994 | Shimomae |
| 5,343,386 | A | 8/1994 | Barber |
| 5,345,505 | A | 9/1994 | Pires |
| 5,347,403 | A | 9/1994 | Uekusa |
| 5,356,971 | A | 10/1994 | Sagawa et al. |
| 5,359,387 | A | 10/1994 | Hicks |
| 5,363,212 | A | 11/1994 | Taniuchi et al. |
| 5,365,312 | A | 11/1994 | Hillmann et al. |
| 5,369,261 | A | 11/1994 | Shamir |
| 5,384,899 | A | 1/1995 | Amit |
| 5,392,365 | A | 2/1995 | Steinkirchner |
| 5,396,286 | A | 3/1995 | Ishizuka |
| 5,398,063 | A | 3/1995 | Yamana |
| 5,398,131 | A | 3/1995 | Hall et al. |
| 5,398,315 | A | 3/1995 | Johnson et al. |
| 5,402,527 | A | 3/1995 | Bigby et al. |
| 5,412,197 | A | 5/1995 | Smith |
| 5,412,402 | A | 5/1995 | Searby et al. |
| 5,414,529 | A | 5/1995 | Terada et al. |
| 5,420,607 | A | 5/1995 | Miller et al. |
| 5,420,635 | A | 5/1995 | Konishi et al. |
| 5,428,423 | A | 6/1995 | Clark |
| 5,432,896 | A | 7/1995 | Hwong et al. |
| 5,434,618 | A | 7/1995 | Hayashi et al. |
| 5,434,621 | A | 7/1995 | Yu |
| 5,436,657 | A | 7/1995 | Fukuoka |
| 5,438,359 | A | 8/1995 | Aoki et al. |
| 5,438,430 | A | 8/1995 | Mackinlay et al. |
| 5,442,188 | A | 8/1995 | Brimbal et al. |
| 5,442,567 | A | 8/1995 | Small |
| 5,444,230 | A | 8/1995 | Baldwin et al. |
| 5,444,543 | A | 8/1995 | Sakano |
| 5,450,365 | A | 9/1995 | Adachi et al. |
| 5,452,033 | A | 9/1995 | Balling et al. |
| 5,457,515 | A | 10/1995 | Quadracci et al. |
| 5,457,554 | A | 10/1995 | Faris |
| 5,459,819 | A | 10/1995 | Watkins et al. |
| 5,461,440 | A | 10/1995 | Toyoda et al. |
| 5,462,375 | A | 10/1995 | Isobe et al. |
| 5,463,470 | A | 10/1995 | Terashita et al. |
| 5,466,918 | A | 11/1995 | Ray et al. |
| 5,467,118 | A | 11/1995 | Gragg et al. |
| 5,475,318 | A | 12/1995 | Marcus et al. |
| 5,477,264 | A | 12/1995 | Sarbadhikari et al. |
| 5,479,015 | A | 12/1995 | Rudman et al. |
| 5,482,389 | A | 1/1996 | Bickoff et al. |
| 5,483,379 | A | 1/1996 | Svanberg et al. |
| 5,488,223 | A | 1/1996 | Austin et al. |
| 5,489,935 | A | 2/1996 | Dornier |
| 5,489,995 | A | 2/1996 | Iso et al. |
| 5,493,409 | A | 2/1996 | Maeda et al. |
| 5,495,568 | A | 2/1996 | Beavin |
| 5,502,485 | A | 3/1996 | Suzuki |
| 5,502,529 | A | 3/1996 | Zander |
| 5,502,577 | A | 3/1996 | Mackinlay et al. |
| 5,506,603 | A | 4/1996 | Kawano et al. |
| 5,506,620 | A | 4/1996 | Ozawa |
| 5,512,951 | A | 4/1996 | Torii |
| 5,513,117 | A | 4/1996 | Small et al. |
| 5,515,101 | A | 5/1996 | Yoshida |
| 5,515,104 | A | 5/1996 | Okada |
| 5,517,222 | A | 5/1996 | Sugiyama et al. |
| 5,517,241 | A | 5/1996 | Adachi et al. |
| 5,521,372 | A | 5/1996 | Hecht et al. |
| 5,521,710 | A | 5/1996 | Strossman |
| 5,523,780 | A | 6/1996 | Hirosawa et al. |
| 5,524,194 | A | 6/1996 | Chida et al. |
| 5,528,339 | A | 6/1996 | Buhr et al. |
| 5,529,279 | A | 6/1996 | Beatty et al. |
| 5,533,172 | A | 7/1996 | Hurtz et al. |
| 5,534,900 | A | 7/1996 | Ohno et al. |
| 5,534,962 | A | 7/1996 | Zander |
| 5,537,144 | A | 7/1996 | Faris |
| 5,537,294 | A | 7/1996 | Siwinski |
| 5,539,456 | A | 7/1996 | Ishii |
| 5,542,487 | A | 8/1996 | Schultz et al. |
| 5,549,740 | A | 8/1996 | Takahashi et al. |
| 5,552,837 | A | 9/1996 | Mankovitz |
| 5,554,432 | A | 9/1996 | Sandor et al. |
| 5,555,428 | A | 9/1996 | Radigan et al. |
| 5,555,496 | A | 9/1996 | Tackbary et al. |
| 5,557,310 | A | 9/1996 | Kurata et al. |
| 5,559,714 | A | 9/1996 | Banks et al. |
| 5,559,932 | A | 9/1996 | Machida et al. |
| 5,561,604 | A | 10/1996 | Buckley et al. |
| 5,563,643 | A | 10/1996 | Carlotta et al. |
| 5,563,722 | A | 10/1996 | Norris |
| 5,565,900 | A | 10/1996 | Cowger et al. |
| 5,566,906 | A | 10/1996 | Kamada et al. |
| 5,570,130 | A | 10/1996 | Horii et al. |
| 5,570,435 | A | 10/1996 | Bloomberg et al. |
| 5,572,310 | A | 11/1996 | Hoberock et al. |
| 5,572,596 | A | 11/1996 | Wildes et al. |
| 5,572,635 | A | 11/1996 | Takizawa et al. |
| 5,576,783 | A | 11/1996 | Lee |
| 5,579,116 | A | 11/1996 | Sugiyama et al. |
| 5,579,445 | A | 11/1996 | Loce et al. |
| 5,581,773 | A | 12/1996 | Glover |
| 5,583,971 | A | 12/1996 | Lo |
| 5,587,740 | A | 12/1996 | Brennan |
| 5,592,237 | A | 1/1997 | Greenway et al. |
| 5,592,597 | A | 1/1997 | Kiss |
| 5,594,500 | A | 1/1997 | Tanaka et al. |
| 5,598,202 | A | 1/1997 | Peterson |
| 5,600,402 | A | 2/1997 | Kainen |
| 5,602,377 | A | 2/1997 | Beller et al. |
| 5,602,412 | A | 2/1997 | Suzuki et al. |
| 5,604,537 | A | 2/1997 | Yamazaki et al. |
| 5,606,420 | A | 2/1997 | Maeda et al. |
| 5,610,761 | A | 3/1997 | Ishibashi et al. |
| 5,613,175 | A | 3/1997 | Frankel |
| 5,615,123 | A | 3/1997 | Davidson et al. |
| 5,619,030 | A | 4/1997 | Shiomi |
| 5,619,622 | A | 4/1997 | Audi et al. |
| 5,619,737 | A | 4/1997 | Horning et al. |
| 5,621,524 | A | 4/1997 | Mitani |
| 5,621,545 | A | 4/1997 | Motta et al. |
| 5,621,868 | A | 4/1997 | Mizutani et al. |
| 5,624,732 | A | 4/1997 | Oshima et al. |
| 5,625,770 | A | 4/1997 | Nomura |
| 5,633,678 | A | 5/1997 | Parulski et al. |
| 5,634,730 | A | 6/1997 | Bobry |
| 5,638,103 | A | 6/1997 | Obata et al. |
| 5,642,226 | A | 6/1997 | Rosenthal |
| 5,644,341 | A | 7/1997 | Fuji et al. |
| 5,644,431 | A | 7/1997 | Magee |
| 5,644,557 | A | 7/1997 | Akamine et al. |
| 5,646,658 | A | 7/1997 | Thiel et al. |
| 5,666,226 | A | 9/1997 | Ezra et al. |
| 5,666,411 | A | 9/1997 | McCarty |
| 5,678,081 | A | 10/1997 | Tanaka |
| 5,679,456 | A | 10/1997 | Sakai et al. |
| 5,682,191 | A | 10/1997 | Barrett et al. |
| 5,687,304 | A | 11/1997 | Kiss |
| 5,688,056 | A | 11/1997 | Peyret |
| 5,689,740 | A | 11/1997 | Uchiyama |
| 5,692,225 | A | 11/1997 | Bernardi et al. |
| 5,696,892 | A | 12/1997 | Redmann et al. |
| 5,697,006 | A | 12/1997 | Toguchi et al. |
| 5,703,961 | A | 12/1997 | Rogina et al. |
| 5,706,049 | A | 1/1998 | Moghadam et al. |
| 5,708,900 | A | 1/1998 | Yokoyama et al. |
| 5,710,582 | A | 1/1998 | Hawkins et al. |
| 5,710,948 | A | 1/1998 | Takagi |
| 5,715,228 | A | 2/1998 | Takiguchi |
| 5,715,325 | A | 2/1998 | Bang et al. |
| 5,717,197 | A | 2/1998 | Petrie |
| 5,719,621 | A | 2/1998 | Tsunefuji |
| 5,719,970 | A | 2/1998 | Aoki et al. |
| 5,726,435 | A | 3/1998 | Hara et al. |

| | | | | | |
|---|---|---|---|---|---|
| 5,726,693 A | 3/1998 | Sharma et al. | 5,867,213 A | 2/1999 | Ouchi |
| 5,729,252 A | 3/1998 | Fraser | 5,867,394 A | 2/1999 | LaDue et al. |
| 5,729,471 A | 3/1998 | Jain et al. | 5,870,102 A | 2/1999 | Tarolli et al. |
| 5,731,062 A | 3/1998 | Kim et al. | 5,872,594 A | 2/1999 | Thompon |
| 5,734,154 A | 3/1998 | Jachimowicz et al. | 5,874,836 A | 2/1999 | Nowak et al. |
| 5,734,425 A | 3/1998 | Takizawa et al. | 5,875,034 A | 2/1999 | Shintani et al. |
| 5,742,305 A | 4/1998 | Hackleman | 5,878,292 A | 3/1999 | Bell et al. |
| 5,745,175 A | 4/1998 | Anderson et al. | 5,881,211 A | 3/1999 | Matsumura |
| 5,748,228 A | 5/1998 | Kobayashi et al. | 5,884,013 A | 3/1999 | Bosschaerts et al. |
| 5,748,326 A | 5/1998 | Thompson-Bell et al. | 5,884,118 A | 3/1999 | Mestha et al. |
| 5,748,856 A | 5/1998 | Cariffe et al. | 5,886,371 A | 3/1999 | Shinagawa |
| 5,750,974 A | 5/1998 | Sasaki et al. | 5,894,309 A | 4/1999 | Freeman et al. |
| 5,751,303 A | 5/1998 | Erickson et al. | 5,894,326 A | 4/1999 | McIntyre et al. |
| 5,751,318 A | 5/1998 | Granzow | 5,896,155 A | 4/1999 | Lebens et al. |
| 5,751,590 A | 5/1998 | Cannon et al. | 5,896,169 A | 4/1999 | Boelart |
| 5,752,114 A | 5/1998 | Saito et al. | 5,896,176 A | 4/1999 | Das et al. |
| 5,753,344 A | 5/1998 | Jacobsen | 5,896,403 A | 4/1999 | Nagasaki et al. |
| 5,754,227 A | 5/1998 | Fukuoka | 5,900,909 A | 5/1999 | Parulski et al. |
| 5,754,690 A | 5/1998 | Jackson et al. | 5,905,529 A | 5/1999 | Inuiya et al. |
| 5,754,700 A | 5/1998 | Kuzma | 5,907,354 A | 5/1999 | Cama et al. |
| 5,755,519 A | 5/1998 | Klinefelter | 5,907,415 A | 5/1999 | Yabe |
| 5,756,978 A | 5/1998 | Soltesz et al. | 5,907,434 A | 5/1999 | Sekine et al. |
| 5,757,388 A | 5/1998 | Stephenson | 5,909,227 A | 6/1999 | Silverbrook |
| 5,757,393 A | 5/1998 | Suzuki | 5,909,248 A | 6/1999 | Stephenson |
| 5,760,814 A | 6/1998 | Kang | 5,909,562 A | 6/1999 | Faget et al. |
| 5,761,726 A | 6/1998 | Guttag et al. | 5,911,056 A | 6/1999 | Faget et al. |
| 5,767,945 A | 6/1998 | Fields et al. | 5,914,748 A | 6/1999 | Parulski et al. |
| 5,768,482 A | 6/1998 | Winter et al. | 5,914,801 A | 6/1999 | Dhuler et al. |
| 5,768,609 A | 6/1998 | Gove et al. | 5,916,358 A | 6/1999 | Bagchi et al. |
| 5,771,245 A | 6/1998 | Zhang | 5,917,542 A | 6/1999 | Moghadam et al. |
| 5,781,708 A | 7/1998 | Austin et al. | 5,917,937 A | 6/1999 | Szeliski et al. |
| 5,781,924 A | 7/1998 | Zaitzeva et al. | 5,917,963 A | 6/1999 | Miyake |
| 5,784,088 A | 7/1998 | Ujita et al. | 5,921,686 A | 7/1999 | Baird et al. |
| 5,784,521 A | 7/1998 | Nakatani et al. | 5,923,406 A | 7/1999 | Brasington et al. |
| 5,787,193 A | 7/1998 | Balasubramanian | 5,923,882 A | 7/1999 | Ho et al. |
| 5,788,388 A | 8/1998 | Cowger et al. | 5,924,737 A | 7/1999 | Schrupp |
| 5,790,193 A | 8/1998 | Ohmori | 5,930,528 A | 7/1999 | Ito et al. |
| 5,790,699 A | 8/1998 | Jackson et al. | 5,933,137 A | 8/1999 | Anderson et al. |
| 5,792,249 A | 8/1998 | Shirota et al. | 5,933,179 A | 8/1999 | Fogle et al. |
| 5,796,429 A | 8/1998 | Suzuki et al. | 5,937,089 A | 8/1999 | Kobayashi |
| 5,801,854 A | 9/1998 | Naylor, Jr. | 5,938,766 A | 8/1999 | Anderson et al. |
| 5,802,413 A | 9/1998 | Stephenson | 5,940,095 A | 8/1999 | Parish et al. |
| 5,805,213 A | 9/1998 | Spaulding et al. | 5,949,426 A | 9/1999 | Rich |
| 5,805,296 A | 9/1998 | Hattori et al. | 5,949,459 A | 9/1999 | Gasvoda et al. |
| 5,805,550 A | 9/1998 | Ohmori | 5,949,467 A | 9/1999 | Gunther et al. |
| 5,805,936 A | 9/1998 | Matsuzaki et al. | 5,949,967 A | 9/1999 | Spaulding et al. |
| 5,809,292 A | 9/1998 | Wilkinson et al. | 5,955,817 A | 9/1999 | Dhuler et al. |
| 5,812,071 A | 9/1998 | Kairouz | 5,956,163 A | 9/1999 | Clarke et al. |
| 5,812,156 A | 9/1998 | Bullock et al. | 5,959,943 A | 9/1999 | Yonezawa |
| 5,815,186 A | 9/1998 | Lewis et al. | 5,960,412 A | 9/1999 | Tackbary et al. |
| 5,818,023 A | 10/1998 | Meyerson et al. | 5,963,104 A | 10/1999 | Buer |
| 5,818,032 A | 10/1998 | Sun et al. | 5,964,156 A | 10/1999 | Smith et al. |
| 5,819,240 A | 10/1998 | Kara | 5,966,134 A | 10/1999 | Arias |
| 5,819,662 A | 10/1998 | Koyabu | 5,966,553 A | 10/1999 | Nishitani et al. |
| 5,822,606 A | 10/1998 | Morton | 5,969,322 A | 10/1999 | Mori et al. |
| 5,822,608 A | 10/1998 | Dieffenderfer et al. | 5,973,751 A | 10/1999 | Ishida et al. |
| 5,824,410 A | 10/1998 | Sakai et al. | 5,974,168 A | 10/1999 | Rushmeier et al. |
| 5,825,383 A | 10/1998 | Abe et al. | 5,974,190 A | 10/1999 | Maeda et al. |
| 5,825,882 A | 10/1998 | Kowalski et al. | 5,974,234 A | 10/1999 | Levine et al. |
| 5,825,947 A | 10/1998 | Sasaki et al. | 5,974,238 A | 10/1999 | Chase, Jr. |
| 5,826,333 A | 10/1998 | Iketani et al. | 5,977,982 A | 11/1999 | Lauzon |
| 5,835,136 A | 11/1998 | Watanabe et al. | 5,978,100 A | 11/1999 | Kinjo |
| 5,835,616 A | 11/1998 | Lobo et al. | 5,978,511 A | 11/1999 | Horiuchi et al. |
| 5,835,641 A | 11/1998 | Sotoda et al. | 5,978,609 A | 11/1999 | Aoki |
| 5,838,331 A | 11/1998 | Debry | 5,980,010 A | 11/1999 | Stephenson |
| 5,841,441 A | 11/1998 | Smith | 5,982,378 A | 11/1999 | Kato |
| 5,845,166 A | 12/1998 | Fellegara et al. | 5,982,424 A | 11/1999 | Simerly et al. |
| 5,847,836 A | 12/1998 | Suzuki | 5,986,671 A | 11/1999 | Fredlund et al. |
| 5,848,255 A | 12/1998 | Kondo | 5,986,698 A | 11/1999 | Nobuoka |
| 5,850,234 A | 12/1998 | Kneezel et al. | 5,986,706 A | 11/1999 | Hirasawa |
| 5,852,502 A | 12/1998 | Beckett | 5,986,718 A | 11/1999 | Barwacz et al. |
| 5,852,673 A | 12/1998 | Young et al. | 5,989,678 A | 11/1999 | Jacobson |
| 5,854,648 A | 12/1998 | Hanabusa | 5,990,973 A | 11/1999 | Sakamoto |
| 5,854,882 A | 12/1998 | Wang | 5,991,429 A | 11/1999 | Coffin et al. |
| 5,859,921 A | 1/1999 | Suzuki | 5,991,865 A | 11/1999 | Longhenry et al. |
| 5,860,036 A | 1/1999 | Stephenson | 5,992,994 A | 11/1999 | Rasmussen et al. |
| 5,860,363 A | 1/1999 | Childers et al. | 5,995,772 A | 11/1999 | Barry et al. |
| 5,864,630 A | 1/1999 | Cosatto et al. | 5,996,893 A | 12/1999 | Soscia |
| 5,866,253 A | 2/1999 | Philipps et al. | 5,997,124 A | 12/1999 | Capps et al. |

| | | |
|---|---|---|
| 5,999,190 A | 12/1999 | Sheasby et al. |
| 5,999,203 A | 12/1999 | Cane et al. |
| 5,999,697 A | 12/1999 | Murase et al. |
| 6,000,773 A | 12/1999 | Murray et al. |
| 6,000,791 A | 12/1999 | Scheffelin et al. |
| 6,005,582 A | 12/1999 | Gabriel et al. |
| 6,006,039 A | 12/1999 | Steinberg et al. |
| 6,009,188 A | 12/1999 | Cohen et al. |
| 6,011,536 A | 1/2000 | Hertzmann et al. |
| 6,011,585 A | 1/2000 | Anderson |
| 6,011,937 A | 1/2000 | Chaussade et al. |
| 6,014,165 A | 1/2000 | McIntyre et al. |
| 6,014,170 A | 1/2000 | Pont et al. |
| RE36,589 E | 2/2000 | Akamine et al. |
| 6,019,449 A | 2/2000 | Bullock et al. |
| 6,020,898 A | 2/2000 | Saito et al. |
| 6,020,931 A | 2/2000 | Bilbrey et al. |
| 6,022,099 A | 2/2000 | Chwalek et al. |
| 6,023,524 A | 2/2000 | Yamaguchi |
| 6,023,757 A | 2/2000 | Nishimoto et al. |
| 6,028,611 A | 2/2000 | Anderson et al. |
| 6,033,137 A | 3/2000 | Ito |
| 6,034,740 A | 3/2000 | Mitsui et al. |
| 6,038,491 A | 3/2000 | McGarry et al. |
| 6,042,213 A | 3/2000 | Hayasaki |
| 6,043,821 A | 3/2000 | Sprague et al. |
| 6,046,768 A | 4/2000 | Kaneda et al. |
| 6,047,130 A | 4/2000 | Oles |
| 6,052,648 A | 4/2000 | Burfeind et al. |
| 6,056,286 A | 5/2000 | Koga |
| 6,057,850 A | 5/2000 | Kichury |
| 6,061,179 A | 5/2000 | Inoguchi et al. |
| 6,062,667 A | 5/2000 | Matsui et al. |
| 6,069,642 A | 5/2000 | Isobe |
| 6,074,042 A | 6/2000 | Gasvoda et al. |
| 6,078,758 A | 6/2000 | Patton et al. |
| 6,084,713 A | 7/2000 | Rosenthal |
| 6,094,221 A | 7/2000 | Anderson |
| 6,094,282 A | 7/2000 | Hoda et al. |
| 6,097,431 A | 8/2000 | Anderson et al. |
| 6,102,505 A | 8/2000 | McIntyre et al. |
| 6,104,430 A | 8/2000 | Fukuoka |
| 6,106,147 A | 8/2000 | Silverbrook |
| 6,111,605 A | 8/2000 | Suzuki |
| 6,118,484 A | 9/2000 | Yokota et al. |
| 6,118,554 A | 9/2000 | Horaguchi |
| 6,122,403 A | 9/2000 | Rhoads |
| 6,133,951 A | 10/2000 | Miyadera |
| 6,134,030 A | 10/2000 | Kaneko et al. |
| 6,134,339 A | 10/2000 | Luo |
| 6,134,353 A | 10/2000 | Makram-Ebeid |
| 6,135,586 A | 10/2000 | McClelland et al. |
| 6,136,212 A | 10/2000 | Mastrangelo et al. |
| 6,137,509 A | 10/2000 | Hayasaki |
| 6,137,521 A | 10/2000 | Matsui |
| 6,141,036 A | 10/2000 | Katayama et al. |
| 6,141,431 A | 10/2000 | Munetsugu et al. |
| 6,144,414 A | 11/2000 | Toba |
| 6,145,025 A | 11/2000 | Lim |
| 6,147,704 A | 11/2000 | Ito et al. |
| 6,149,256 A | 11/2000 | McIntyre et al. |
| 6,157,394 A | 12/2000 | Anderson et al. |
| 6,161,915 A | 12/2000 | Bolash et al. |
| 6,163,340 A | 12/2000 | Yasuda |
| 6,163,361 A | 12/2000 | McIntyre et al. |
| 6,166,832 A | 12/2000 | Fujimoto |
| 6,167,806 B1 | 1/2001 | Chretinat et al. |
| 6,172,706 B1 | 1/2001 | Tasumi |
| 6,178,883 B1 | 1/2001 | Satoh et al. |
| 6,181,377 B1 | 1/2001 | Kobayashi |
| 6,181,379 B1 | 1/2001 | Kingetsu et al. |
| 6,182,901 B1 | 2/2001 | Hecht et al. |
| 6,188,430 B1 | 2/2001 | Motai |
| 6,188,431 B1 | 2/2001 | Oie |
| 6,196,541 B1 | 3/2001 | Silverbrook |
| 6,198,489 B1 | 3/2001 | Salesin et al. |
| 6,199,874 B1 | 3/2001 | Galvin et al. |
| 6,199,969 B1 | 3/2001 | Haflinger et al. |
| 6,201,571 B1 | 3/2001 | Ota |
| 6,203,147 B1 | 3/2001 | Battey et al. |
| 6,204,877 B1 | 3/2001 | Kiyokawa |
| 6,211,911 B1 | 4/2001 | Komiya et al. |
| 6,213,588 B1 | 4/2001 | Silverbrook |
| 6,217,165 B1 | 4/2001 | Silverbrook |
| 6,222,452 B1 | 4/2001 | Ahlstrom et al. |
| 6,226,015 B1 | 5/2001 | Danneels |
| 6,227,643 B1 | 5/2001 | Purcell et al. |
| 6,229,565 B1 | 5/2001 | Bobry |
| 6,234,392 B1 | 5/2001 | Murakami |
| 6,234,608 B1 | 5/2001 | Genovese et al. |
| 6,236,431 B1 | 5/2001 | Hirasawa et al. |
| 6,238,044 B1 | 5/2001 | Silverbrook et al. |
| 6,252,976 B1 | 6/2001 | Schildkraut et al. |
| 6,260,137 B1 | 7/2001 | Fleck et al. |
| 6,262,769 B1 | 7/2001 | Anderson et al. |
| 6,270,177 B1 | 8/2001 | King et al. |
| 6,273,535 B1 | 8/2001 | Inoue et al. |
| 6,278,481 B1 | 8/2001 | Schmidt |
| 6,278,486 B1 | 8/2001 | Hieda et al. |
| 6,278,491 B1 | 8/2001 | Wang et al. |
| 6,280,106 B1 | 8/2001 | Juan et al. |
| 6,285,410 B1 | 9/2001 | Marai |
| 6,290,334 B1 | 9/2001 | Ishinaga et al. |
| 6,292,574 B1 | 9/2001 | Schildkraut et al. |
| 6,294,101 B1 | 9/2001 | Silverbrook |
| 6,297,872 B1 | 10/2001 | Inamura et al. |
| 6,300,976 B1 | 10/2001 | Fukuoka |
| 6,304,291 B1 | 10/2001 | Silverbrook |
| 6,304,684 B1 | 10/2001 | Niczyporuk et al. |
| 6,304,825 B1 | 10/2001 | Nowak et al. |
| 6,305,775 B1 | 10/2001 | Ohtsuka et al. |
| 6,317,156 B1 | 11/2001 | Nagasaki et al. |
| 6,317,192 B1 | 11/2001 | Silverbrook et al. |
| 6,323,912 B1 | 11/2001 | McIntyre |
| 6,325,380 B1 | 12/2001 | Feigl et al. |
| 6,328,395 B1 | 12/2001 | Kitahara et al. |
| 6,334,587 B1 | 1/2002 | Roder |
| 6,357,865 B1 | 3/2002 | Kubby et al. |
| 6,359,650 B1 | 3/2002 | Murakami |
| 6,362,868 B1 | 3/2002 | Silverbrook |
| 6,375,301 B1 | 4/2002 | Childers et al. |
| 6,375,314 B1 | 4/2002 | Reed et al. |
| 6,378,997 B1 | 4/2002 | Nitta |
| 6,386,772 B1 | 5/2002 | Klinefelter et al. |
| 6,390,589 B1 | 5/2002 | Imanaka et al. |
| 6,407,777 B1 | 6/2002 | DeLuca |
| 6,416,152 B1 | 7/2002 | Matsuzaki et al. |
| 6,421,050 B1 | 7/2002 | Ruml et al. |
| 6,425,661 B1 | 7/2002 | Silverbrook et al. |
| 6,431,669 B1 | 8/2002 | Silverbrook |
| 6,442,525 B1 | 8/2002 | Silverbrook et al. |
| 6,472,052 B1 | 10/2002 | Silverbrook |
| 6,489,990 B1 | 12/2002 | Popovich |
| 6,493,031 B1 | 12/2002 | Washizawa |
| 6,530,519 B1 | 3/2003 | Suzuki |
| 6,543,880 B1 | 4/2003 | Akhavain et al. |
| 6,546,187 B1 | 4/2003 | Miyazaki et al. |
| 6,552,821 B2 | 4/2003 | Suzuki |
| 6,573,927 B2 | 6/2003 | Parulski et al. |
| 6,597,394 B1 | 7/2003 | Duncan et al. |
| 6,606,171 B1 | 8/2003 | Renk et al. |
| 6,608,297 B2 | 8/2003 | Neukermans et al. |
| 6,618,091 B1 | 9/2003 | Tamura |
| 6,622,276 B2 | 9/2003 | Nagasaki et al. |
| 6,628,333 B1 | 9/2003 | Gowda et al. |
| 6,633,332 B1 | 10/2003 | Nay et al. |
| 6,634,814 B2 | 10/2003 | Spurr et al. |
| 6,640,004 B2 | 10/2003 | Katayama et al. |
| 6,655,776 B2 | 12/2003 | Murray |
| 6,665,454 B1 | 12/2003 | Silverbrook et al. |
| 6,670,985 B2 | 12/2003 | Karube et al. |
| 6,678,402 B2 | 1/2004 | Jones et al. |
| 6,702,417 B2 | 3/2004 | Silverbrook |
| 6,727,948 B1 | 4/2004 | Silverbrook |
| 6,727,951 B1 | 4/2004 | Silverbrook |
| 6,736,321 B2 | 5/2004 | Tsikos et al. |
| 6,738,903 B1 | 5/2004 | Haines |
| 6,744,526 B2 | 6/2004 | McDermott et al. |

| | | |
|---|---|---|
| 6,745,331 B1 | 6/2004 | Silverbrook |
| 6,750,901 B1 | 6/2004 | Silverbrook |
| 6,750,944 B2 | 6/2004 | Silverbrook et al. |
| 6,773,874 B2 | 8/2004 | Silverbrook |
| 6,791,605 B1 | 9/2004 | Reele et al. |
| 6,803,989 B2 | 10/2004 | Silverbrook |
| 6,820,968 B2 | 11/2004 | Silverbrook |
| 6,831,681 B1 | 12/2004 | Silverbrook |
| 6,837,635 B1 | 1/2005 | Juan |
| 6,847,883 B1 | 1/2005 | Walmsley et al. |
| 6,858,837 B2 | 2/2005 | Tabata |
| 6,870,566 B1 | 3/2005 | Koide et al. |
| 6,879,341 B1 | 4/2005 | Silverbrook |
| 6,888,649 B2 | 5/2005 | Suzuki |
| 6,909,456 B1 | 6/2005 | Sasaki |
| 6,913,875 B2 | 7/2005 | Silverbrook et al. |
| 6,918,542 B2 | 7/2005 | Silverbrook et al. |
| 6,918,654 B2 | 7/2005 | Silverbrook |
| 6,948,661 B2 | 9/2005 | Silverbrook et al. |
| 6,953,235 B2 | 10/2005 | Silverbrook |
| 6,954,254 B2 | 10/2005 | Silverbrook |
| 6,958,207 B1 * | 10/2005 | Khusnatdinov et al. ...... 430/321 |
| 6,985,207 B2 * | 1/2006 | Silverbrook ................... 355/31 |
| 7,044,589 B2 | 5/2006 | Silverbrook |
| 7,050,143 B1 | 5/2006 | Silverbrook et al. |
| 7,058,219 B2 | 6/2006 | Walmsley et al. |
| 7,063,940 B2 | 6/2006 | Silverbrook |
| 7,077,515 B2 | 7/2006 | Silverbrook |
| 7,083,108 B2 | 8/2006 | Silverbrook et al. |
| 7,084,951 B2 | 8/2006 | Silverbrook |
| 7,086,724 B2 | 8/2006 | Silverbrook et al. |
| 7,092,011 B2 | 8/2006 | Silverbrook et al. |
| 7,095,433 B1 | 8/2006 | Touma et al. |
| 7,097,263 B2 | 8/2006 | Silverbrook |
| 7,110,024 B1 | 9/2006 | Silverbrook et al. |
| 7,110,139 B2 | 9/2006 | Silverbrook |
| 7,119,836 B2 | 10/2006 | Silverbrook |
| 7,140,723 B2 | 11/2006 | Silverbrook |
| 7,140,726 B2 | 11/2006 | Silverbrook |
| 7,156,512 B2 | 1/2007 | Silverbrook |
| 7,173,729 B2 | 2/2007 | Silverbrook et al. |
| 7,186,499 B2 | 3/2007 | Silverbrook |
| 7,187,404 B2 | 3/2007 | Silverbrook et al. |
| 7,227,576 B2 | 6/2007 | Umeyama |
| 7,234,645 B2 | 6/2007 | Silverbrook et al. |
| 7,234,801 B2 | 6/2007 | Silverbrook |
| 7,250,975 B2 | 7/2007 | Silverbrook |
| 7,278,723 B2 | 10/2007 | Silverbrook |
| 7,284,843 B2 | 10/2007 | Silverbrook |
| 7,291,447 B2 | 11/2007 | Silverbrook |
| 7,312,845 B2 | 12/2007 | Silverbrook |
| 7,357,497 B2 | 4/2008 | Silverbrook et al. |
| 7,377,706 B2 | 5/2008 | Silverbrook et al. |
| 7,385,639 B2 | 6/2008 | Silverbrook |
| 7,404,633 B2 | 7/2008 | Silverbrook et al. |
| 7,443,434 B2 | 10/2008 | Silverbrook |
| 7,452,048 B2 | 11/2008 | Silverbrook |
| 7,453,492 B2 | 11/2008 | Silverbrook |
| 7,483,053 B2 | 1/2009 | Silverbrook |
| 7,492,490 B2 | 2/2009 | Silverbrook |
| 7,505,068 B2 | 3/2009 | Silverbrook |
| 7,517,071 B2 | 4/2009 | Silverbrook |
| 7,524,045 B2 | 4/2009 | Silverbrook et al. |
| 7,525,687 B2 | 4/2009 | Silverbrook |
| 7,557,853 B2 | 7/2009 | Silverbrook |
| 7,575,313 B2 | 8/2009 | Silverbrook |
| 7,576,794 B2 | 8/2009 | Silverbrook |
| 7,576,795 B2 | 8/2009 | Silverbrook |
| 7,581,826 B2 | 9/2009 | Silverbrook |
| 7,590,347 B2 * | 9/2009 | Silverbrook ................... 396/312 |
| 7,602,423 B2 | 10/2009 | Silverbrook |
| 7,621,607 B2 | 11/2009 | Silverbrook |
| 7,629,999 B2 | 12/2009 | Silverbrook |
| 7,633,535 B2 | 12/2009 | Silverbrook |
| 7,637,594 B2 | 12/2009 | Silverbrook et al. |
| 7,646,403 B2 | 1/2010 | Silverbrook et al. |
| 7,654,626 B2 | 2/2010 | Silverbrook et al. |
| 7,665,834 B2 | 2/2010 | Silverbrook |
| 7,690,765 B2 | 4/2010 | Silverbrook |
| 7,695,108 B2 | 4/2010 | Silverbrook |
| 7,701,506 B2 | 4/2010 | Silverbrook |
| 7,703,910 B2 | 4/2010 | Silverbrook |
| 7,705,891 B2 | 4/2010 | Silverbrook |
| 7,742,696 B2 * | 6/2010 | Silverbrook ................... 396/319 |
| 7,750,971 B2 | 7/2010 | Silverbrook |
| 7,758,166 B2 | 7/2010 | Silverbrook |
| 7,773,125 B2 | 8/2010 | Silverbrook et al. |
| 7,796,166 B2 | 9/2010 | Silverbrook |
| 7,905,574 B2 | 3/2011 | Silverbrook |
| 7,936,395 B2 | 5/2011 | Silverbrook |
| 7,957,009 B2 | 6/2011 | Silverbrook |
| 7,965,416 B2 | 6/2011 | Silverbrook |
| 7,970,275 B2 * | 6/2011 | Silverbrook ................... 396/319 |
| 2001/0007458 A1 | 7/2001 | Purcell et al. |
| 2001/0015760 A1 | 8/2001 | Fellegara et al. |
| 2001/0015818 A1 | 8/2001 | Kawanabe et al. |
| 2001/0040574 A1 | 11/2001 | Prater |
| 2002/0024603 A1 | 2/2002 | Nakayama et al. |
| 2002/0033854 A1 | 3/2002 | Silverbrook et al. |
| 2002/0054212 A1 | 5/2002 | Fukuoka |
| 2002/0063760 A1 | 5/2002 | Dietl et al. |
| 2002/0135266 A1 | 9/2002 | Boutaghou |
| 2002/0141750 A1 | 10/2002 | Ludtke et al. |
| 2003/0043273 A1 | 3/2003 | Suzuki |
| 2003/0076551 A1 | 4/2003 | Kawai et al. |
| 2004/0119827 A1 | 6/2004 | Silverbrook et al. |
| 2004/0125209 A1 | 7/2004 | Silverbrook |
| 2004/0196350 A1 | 10/2004 | Silverbrook |
| 2004/0201764 A1 | 10/2004 | Honda et al. |
| 2004/0257446 A1 | 12/2004 | Silverbrook |
| 2005/0088527 A1 | 4/2005 | Silverbrook |
| 2005/0146613 A1 | 7/2005 | Silverbrook et al. |
| 2006/0098232 A1 | 5/2006 | Nakano et al. |
| 2006/0126102 A1 | 6/2006 | Sakuda |
| 2006/0239676 A1 | 10/2006 | Parulski et al. |
| 2007/0024685 A1 | 2/2007 | Silverbrook |
| 2007/0040856 A1 | 2/2007 | Silverbrook |
| 2007/0046754 A1 | 3/2007 | Silverbrook |
| 2008/0002215 A1 | 1/2008 | Silverbrook et al. |
| 2008/0062232 A1 | 3/2008 | Silverbrook |
| 2008/0152414 A1 | 6/2008 | Silverbrook |
| 2008/0252732 A1 | 10/2008 | Silverbrook et al. |
| 2009/0052879 A1 | 2/2009 | Silverbrook |
| 2009/0141291 A1 | 6/2009 | Yumiki et al. |
| 2009/0207208 A1 | 8/2009 | Silverbrook et al. |
| 2009/0244292 A1 | 10/2009 | Silverbrook et al. |

FOREIGN PATENT DOCUMENTS

| | | |
|---|---|---|
| CA | 2079534 | 4/1993 |
| DE | 248983 A1 | 8/1987 |
| EP | 771101 A2 | 5/1977 |
| EP | 771102 A2 | 5/1977 |
| EP | 89114858.7 | 8/1989 |
| EP | 0332787 | 9/1989 |
| EP | 0354581 | 2/1990 |
| EP | 0382044 A2 | 8/1990 |
| EP | 0398295 A2 | 11/1990 |
| EP | 0430692 A1 | 6/1991 |
| EP | 0438841 A1 | 7/1991 |
| EP | 0512799 A2 | 11/1992 |
| EP | 520289 A2 | 12/1992 |
| EP | 0568357 | 3/1993 |
| EP | 0670555 | 9/1993 |
| EP | 3083015 B1 | 12/1993 |
| EP | 408241 B1 | 10/1994 |
| EP | 725364 A2 | 8/1996 |
| EP | 07-55162 A2 | 1/1997 |
| EP | 0763930 A1 | 3/1997 |
| EP | 0779736 A2 | 6/1997 |
| EP | 0822078 A2 | 2/1998 |
| EP | 0652108 B1 | 2/2003 |
| GB | 1520594 A | 8/1978 |
| GB | 1595797 A | 6/1981 |
| GB | 2212481 A | 7/1989 |
| GB | 2228579 A | 8/1990 |
| GB | 2299787 A | 10/1996 |
| JP | 60-096067 A | 5/1985 |
| JP | 60136480 A | 7/1985 |

| | | |
|---|---|---|
| JP | 61-129740 | 6/1986 |
| JP | 62-32778 | 2/1987 |
| JP | 62-081164 A | 3/1987 |
| JP | 1292483 | 5/1988 |
| JP | 01-148587 | 8/1989 |
| JP | 01-267254 A | 10/1989 |
| JP | 01-277979 A | 11/1989 |
| JP | 02-096880 | 4/1990 |
| JP | 02-178163 A | 7/1990 |
| JP | 03-011483 | 1/1991 |
| JP | 3127341 | 5/1991 |
| JP | 03-227875 | 10/1991 |
| JP | 03-227875 A | 10/1991 |
| JP | 04-200186 A | 7/1992 |
| JP | 05-108278 | 4/1993 |
| JP | 05-137147 | 6/1993 |
| JP | 05-208773 | 8/1993 |
| JP | 05-208773 A | 8/1993 |
| JP | 06-086197 | 3/1994 |
| JP | 05-056160 | 4/1994 |
| JP | 06-149051 | 5/1994 |
| JP | 06-161047 A | 6/1994 |
| JP | 07-298123 A | 6/1994 |
| JP | 06-238958 A | 8/1994 |
| JP | 07-059107 | 3/1995 |
| JP | 07-129762 | 5/1995 |
| JP | 07-234911 A | 9/1995 |
| JP | 08-002754 A | 1/1996 |
| JP | 0915766 A | 1/1997 |
| JP | 09005902 | 1/1997 |
| JP | 09024631 A | 1/1997 |
| JP | 09-069064 | 3/1997 |
| JP | 09-071015 | 3/1997 |
| JP | 09065266 | 3/1997 |
| JP | 09-116843 | 5/1997 |
| JP | 09-149311 | 6/1997 |
| JP | 09-187040 | 7/1997 |
| JP | 09-261382 | 10/1997 |
| JP | 10-107981 A | 4/1998 |
| JP | 01-267254 | 10/1999 |
| WO | WO 83/03941 A1 | 11/1983 |
| WO | WO 86/05641 A1 | 9/1986 |
| WO | WO 87/07741 A1 | 12/1987 |
| WO | WO 93/04425 A1 | 3/1993 |
| WO | WO 95/16323 | 6/1995 |
| WO | WO 95/16323 A1 | 6/1995 |
| WO | WO 96/32265 A | 10/1996 |
| WO | WO 96/32265 A1 | 10/1996 |
| WO | WO 96/32281 A2 | 10/1996 |
| WO | WO 96/32808 A1 | 10/1996 |
| WO | WO 97/05738 A1 | 2/1997 |
| WO | WO 97/06958 A | 2/1997 |
| WO | WO 97/06958 A1 | 2/1997 |
| WO | WO 03/095224 A1 | 11/2003 |

OTHER PUBLICATIONS

Barry Cipra (The Ubiquitous Reed-Solomon Codes: Siam News, vol. 26, No. 1, Jan. 1993).
Booklet "First impressions: digital photography", IS&T 46th Annual Conference, cambridge, Massachusetts, May 11, 1993.
Chi et al., "Drawing and Animation Using Skeletal Strokes", Computer Graphics 1994, pp. 1-9.
Curtis et al., "Computer-Generated Watercolor", SIGGRAPH Conference Proceedings 1997, pp. 421-430.
Fisher, Joseph A., "Very Long instruction Word Architectures and the ELI-312", 1983, ACM, International Symposium on Computer Architecture, pp. 140-150.
Foley, "Computer Graphics: Principles and Practice", Second Edition, pp. 628-820, 1990.
Gonzalez, R.C., Woods R.E., "Digital Image Processing", Addison-Wesley Publishing Company, Inc., pp. 458-462.
Gregory Ta Kovacs, Micromachined transducers sourcebook. 1998, Tom Casson, pp. 289-293.
Hayat et al., "A Fast Thinning Algorithom based on Image Compression", IEEE 1991, pp. 2661-2664.
Litwinowicz, "Processing Images and Video for an Impressionist Effect", SIGGRAPH 1997 Conference Proceedings, pp. 1-9.
Meade, Instruction Manual 1996, Meade Instruments Corporation, 1-16.
Ogniewicz, Skeleton-Space: A Multiscale Space Description Combining Region and Boundary Information, IEEE 1994, pp. 746-751.
Russ, John C., "The image processing handbook", 2nd Edition, CRC Press, pp. 355-361.
Sakamoto T., Makanishi C., Hase T, "Software Pixel Interpolation for Digital Still Henrich D." Space-efficient Region Filling in Raster Graphics International Journal of Computer Graphics 1993 (Abstract).
Sakamoto T., Makanishi C., Hase T, "Software Pixel interpolation for Digital Still Ohzu et al.," Behind the Scenes of Virtual Reality: Vision and Motion Proceedings of the IEEEE, Invited Paper, vol. 84, Issue 5, May 1996. pp. 782-798.
Sakamoto T., Makanishi C., Hase T, "Software Pixel Interpolation for Digital Still Ohzu et al.," Behind the Scenes of Virtual Ong et al., "Image Analysis of Tissue Sections" Computers in Biology and Medicine, vol. 26, No. 3, May 1996. Elsevier Science Lt.
Salisbury et al., "Interactive Pen-and-Ink Illustration", SIGGRAPH Conference Proceedings 1994, pp. 101-108.
Singh et al., "Object Skeletons from Sparse Shape in Industrial Image Settings", IEEE 1998, pp. 3388-3393.
Thorpe, Laurence J., and Takeuchi, A., "The All-Digital Camcorder—The Arrival of Electronic Cinematography".
Yarmish et al (Assembly Language Fundamentals: ISBN: 0-201-08798-7: pp. 13-16)—1979.

* cited by examiner

DIGITAL CAMERA SYSTEM FOR SIMULTANEOUS PRINTING AND MAGNETIC RECORDING

CROSS-REFERENCE TO RELATED APPLICATIONS

This application is a continuation of U.S. application Ser. No. 12/818,138 filed Jun. 17, 2010, now Issued U.S. Pat. No. 7,970,275, which is a continuation of U.S. Ser. No. 12/542, 606 filed on Aug. 17, 2009, now Issued U.S. Pat. No. 7,742, 696, which is a continuation of U.S. Ser. No. 11/951,960 filed Dec. 6, 2007, now Issued U.S. Pat. No. 7,590,347, which is a continuation of U.S. Ser. No. 11/190,902, filed on Jul. 28, 2005, now issued U.S. Pat. No. 7,558,476, which is a Continuation of U.S. Ser. No. 10/176,680, filed on Jun. 24, 2002, now Issued U.S. Pat. No. 6,985,207, which is a Continuation-In-Part of 09/112,788 filed Jul. 10, 1998 (now abandoned), all of which are herein incorporated by reference.

FIELD OF THE INVENTION

The present invention relates to the field of digital image cameras and in particular, discloses a Camera and Media for Art Prints or Photos with Magnetically Recordable Feature.

BACKGROUND OF THE INVENTION

The preferred embodiment is preferably implemented through modification of a hand held camera device such as that described in patent application U.S. Ser. No. 09/113,060, which claims priority from Australian provisional application No. PO7991 entitled "Image Processing Method and Apparatus" (Art 01) filed 15 Jul., 1997.

The aforementioned patent specification discloses a camera system, hereinafter known as an "Artcam" type camera, wherein sensed images can be directly printed out by an Artcam portable camera unit. Further, the aforementioned specification discloses means and methods for performing various manipulations on images captured by the camera sensing device leading to the production of various effects in any output image. The manipulations are disclosed to be highly flexible in nature and can be implemented through the insertion into the Artcam of cards having encoded thereon various instructions for the manipulation of images, the cards hereinafter being known as Artcards. The Artcam further has significant onboard processing power in an Artcam Central Processor unit (ACP) which is interconnected to a memory device for the storage of important data and images.

The Artcam camera system which a digital camera with an inbuilt integral color printer. Additionally, the camera provides hardware and software for the increasing of the apparent resolution of the image sensing system and the conversion of the image to a wide range of "artistic styles" and a graphic enhancement.

In one aspect, the Artcam camera system comprises at least one area image sensor for imaging a scene, a camera processor means for processing said imaged scene in accordance with a predetermined scene transformation requirement, a printer for printing out said processed image scene on print media, print media and printing ink stored in a single detachable module inside said camera system, said camera system comprising a portable hand held unit for the imaging of scenes by said area image sensor and printing said scenes directly out of said camera system via said printer.

Preferably the camera system includes a print roll for the storage of print media and printing ink for utilization by the printer, the print roll being detachable from the camera system. Further, the print roll can include an authentication chip containing authentication information and the camera processing means is adapted to interrogate the authentication chip so as to determine the authenticity of said print roll when inserted within said camera system.

Further, the printer can include a drop on demand ink jet printer and guillotine means for the separation of printed photographs.

With such an arrangement, it would be desirable to be able to record ancillary information with each output photograph.

SUMMARY OF THE INVENTION

According to an aspect of the present disclosure, a digital camera system comprising: a print medium having a first surface delimiting an area in which images are printed, and a second surface pre-treated to be magnetically sensitive; a photo-width printhead integrated with a digital camera, the photo-width printhead for printing digital images on the first surface of the print medium; and a magnetic recorder for recording information associated with said digital images on the second surface of the print medium at the same time the printhead prints the digital images onto the printing area.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

In the preferred embodiment a magnetic sensitive print media material is utilized for the recording of an audio message on the back of an output photograph. The Artcam device is altered so as to include a magnetic recording device which can comprise an array of magnetic recorders covering a whole surface of the photograph or alternatively, a magnetic strip can be provided wherein, for example, a central portion of the photograph is magnetically sensitive. The Artcam devices are further provided with the ability to record an audio message for later playback.

The preferred embodiment is preferably implemented through suitable programming of a hand held camera device such as that described in Australian Provisional Patent Application No. P07991 U.S. Ser. No. 09/113,060) entitled "Image Processing Method and Apparatus (Art 01)" filed 15 Jul., 1997.

The aforementioned patent specification discloses a camera system, hereinafter known as an "Artcam" type camera, wherein sensed images can be directly printed out by an Artcam portable camera unit. Further, the aforementioned specification discloses means and methods for performing various manipulations on images captured by the camera sensing device leading to the production of various effects in any output image. The manipulations are disclosed to be highly flexible in nature and can be implemented through the insertion into the Artcam of cards having encoded thereon various instructions for the manipulation of images, the cards hereinafter being known as Artcards. The Artcam further has significant onboard processing power by an Artcam Central Processor unit (ACP) which is interconnected to a memory device for the storage of important data and images.

In the preferred embodiment, the Artcam device is suitably modified so as to equip it with a microphone device and associated recording technologies. When a picture is taken, the opportunity is provided to record either the surrounding sound environment or a message associated with the image. The print media or film is pretreated so as to make it magnetically sensitive in a similar manner to that provided by tape media. The recording can be over the whole back surface of the output photo or alternatively a magnetically sensitive strip may be provided. The recorded audio is stored on the back of the output photograph in an encoded format, the encoding preferably being of a highly digital resilient form. The recorded audio provides a permanent audio record associated with the corresponding photograph. Subsequently, a playback apparatus is provided for scanning the encoded audio and decoding this information.

Figure 1:
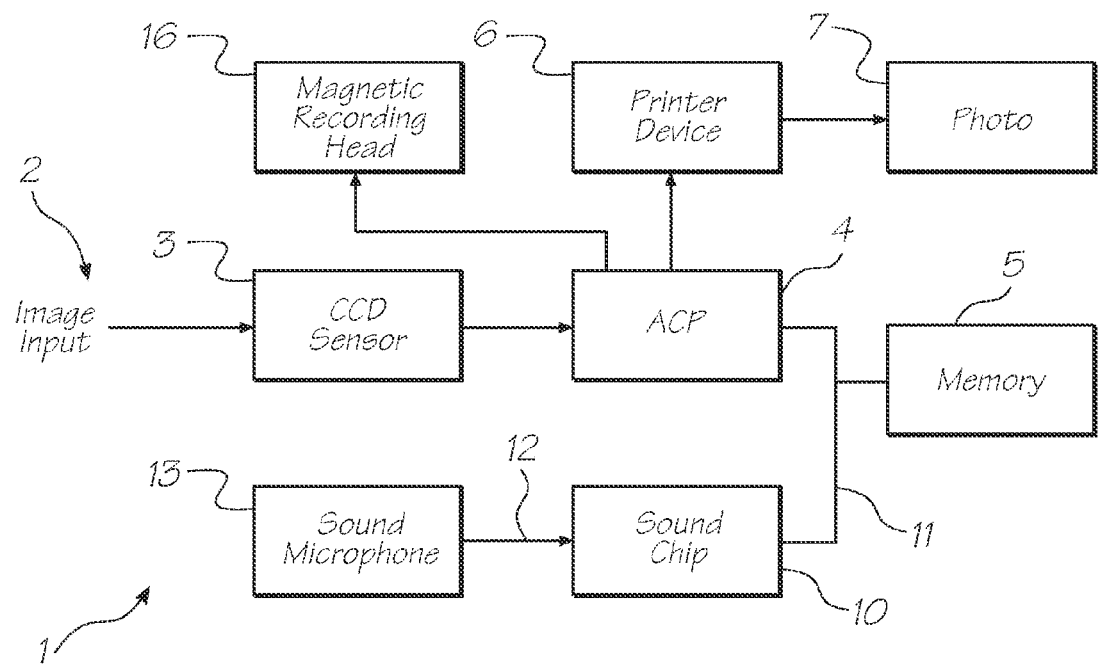
FIG. 1 illustrates schematically the camera system constructed in accordance to the preferred embodiment.

Turning now to FIG. 1, there is illustrated, in schematic form the preferred embodiment 1 which includes the arrangement as described in the aforementioned patent specification wherein an image 2 is sensed via a CCD sensor 3 and forwarded to an Artcam central processor 4 which includes significant computational resources as described in the aforementioned patent specification. The Artcam central processor 4 can store the image in memory 5 which preferably comprises a high speed RAMBUS (Trade Mark) interfaced memory. The Artcam central processor 4 is also responsible for controlling the operation of a printhead 6 for the printing out of full colour photographs, eg. 7, so as to provide for instant images on demand in addition to the magnetic recording head 16, for recording on the back of the photo.

In the preferred embodiment, the camera arrangement 1 is also supplied with a sound chip 10 which interfaces via RAMBUS bus 11 to memory 5 under the control of the ACP processor 4. The sound chip 10 can be of a standard or specialised form and can, for example, comprise a DSP microcessor that takes an analogue input 12 from a sound microphone 13. Alternatively, with increasing chip complexities (Moore's Law), the functionality of sound chip 10 can be incorporated onto the ACP chip 4 which preferably comprises a leading edge CMOS type integrated circuit chip. It will be readily evident that many other types of arrangements can be provided which fall within the scope of the present invention.

The sound chip 10 converts the analogue input 12 to a corresponding digital form and forwards it for storage in memory 5. The recording process can be activated by means of the depressing of a button (not shown) on the camera device, the button being under the control of the ACP processor 4 otherwise it can be substantially automatic when taking a photo. The recorded data is stored in the memory 5.

Figure 2:
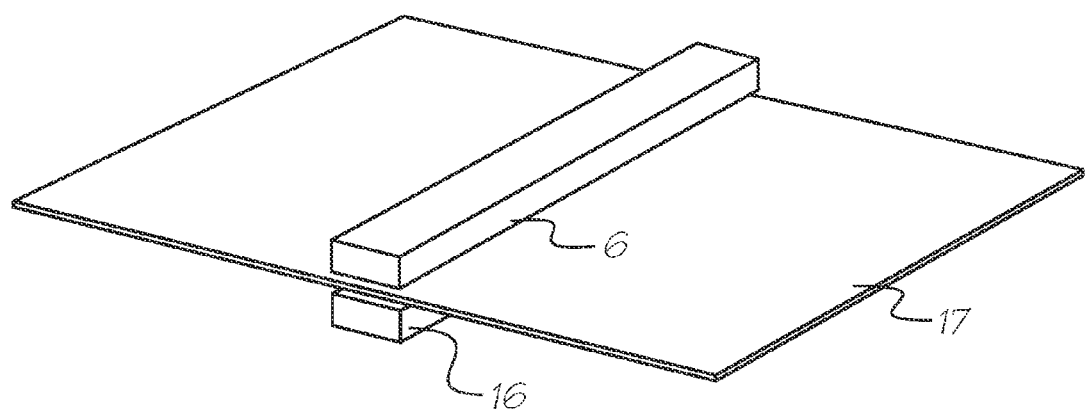
FIG. 2 illustrates schematically a printer mechanism and recording mechanism of the preferred embodiment.

Turning now to FIG. 2, the camera arrangement preferably includes a printer device 6 such as an ink jet printer which includes a printhead 6 to print an image on compatible print media 17 and a magnetic recording head 16. A further printhead can be used to print information on the back of print media 17. Similar arrangements for printing information on the back of an output photo image are described in U.S. Ser. No. 09/112,741 (Art 12) the contents of which are hereby incorporated by cross reference.

Figure 3:
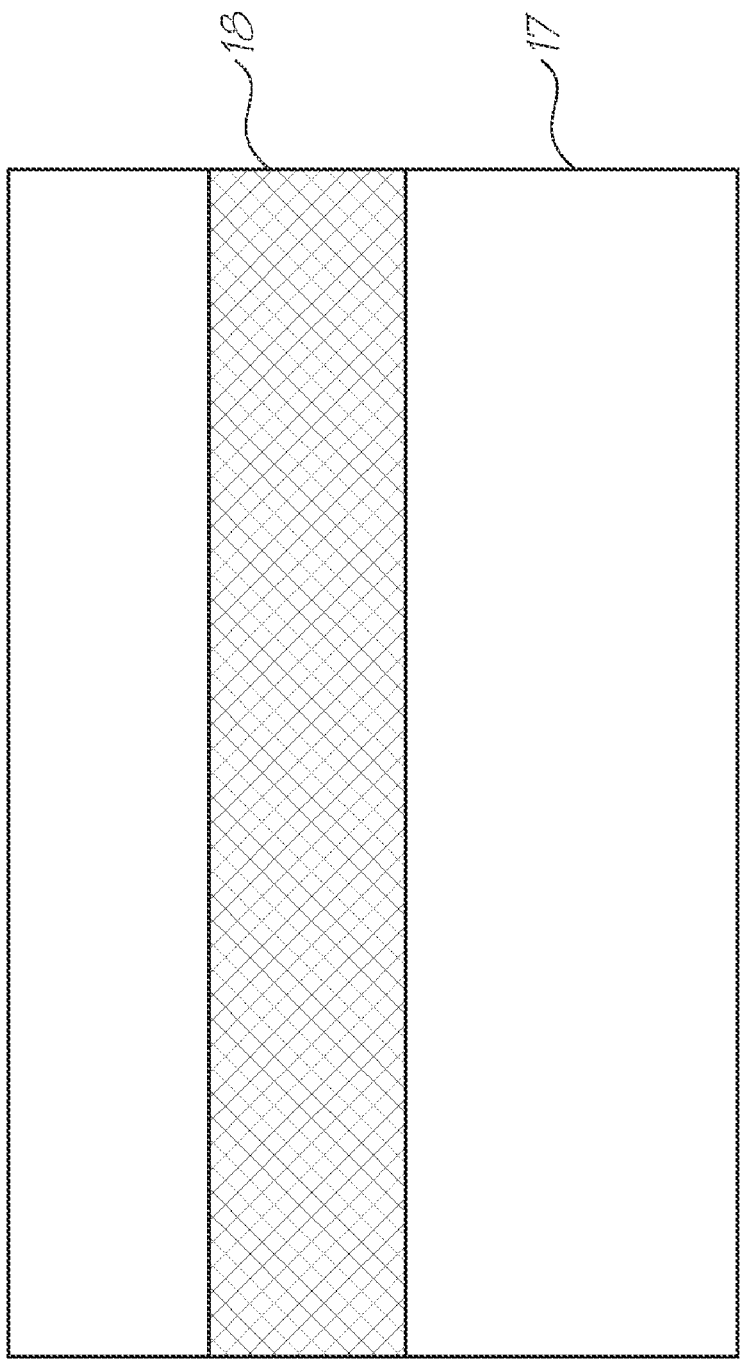
FIG. 3 illustrates a format of the magnetic strip on the back of the photo.
Figure 4:
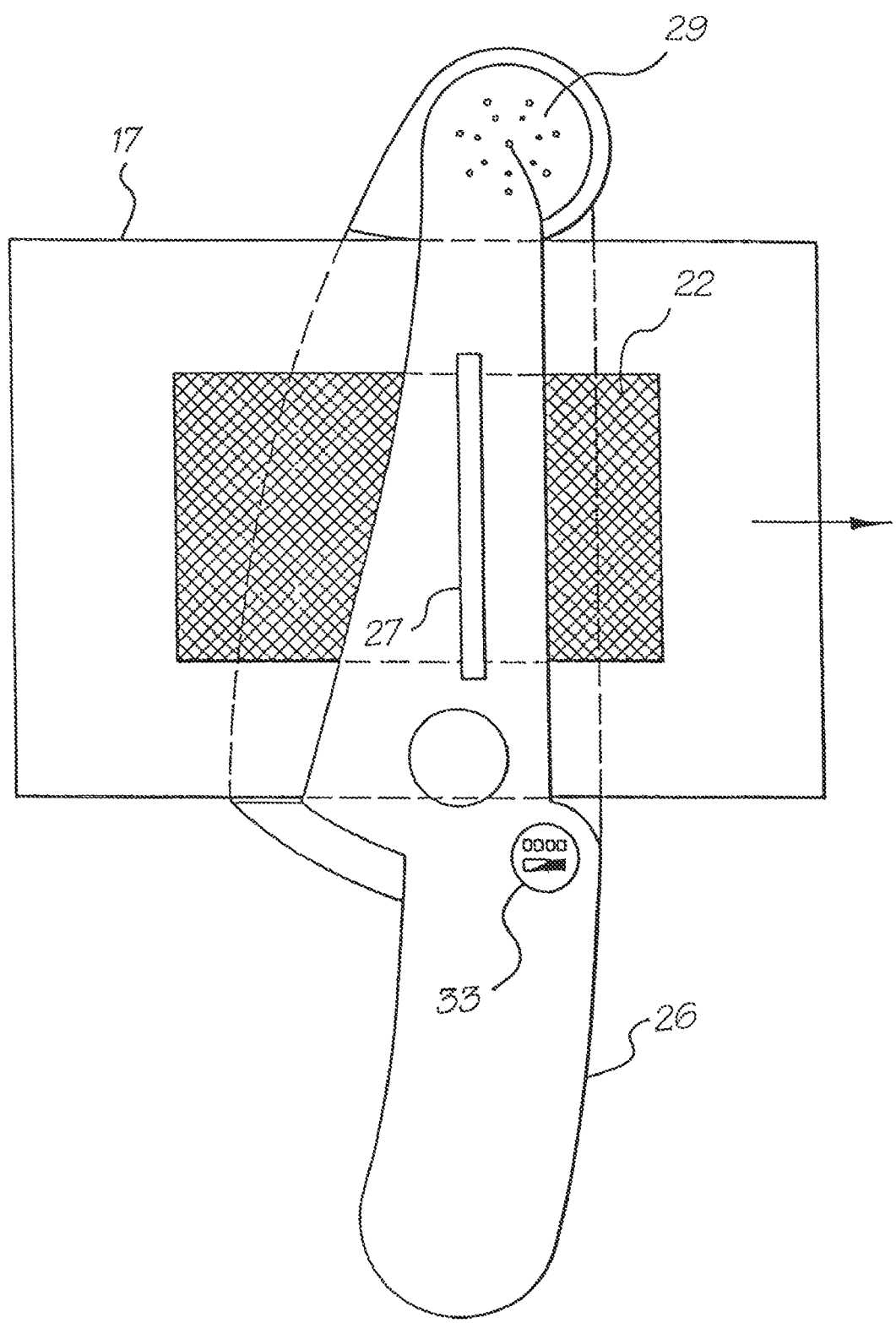
FIG. 4 illustrates a reader device utilized to read data recorded on the back of a photograph.

Turning now to FIG. 3, there is illustrated an example of a magnetic strip 18 formed on the back of photo media 17, the strip being recorded on by recording head 16 of FIG. 1 or FIG. 2. The information recorded can include location, date and time data with the location data being provided by means of keyboard input or, alternatively, through the inclusion of a positioning systems such as GPS or the like. FIG. 4 shows the back of the image 17 on which is also recorded an encoded form 22 of the audio information. The format of the encoding can be any form within the knowledge of the person skilled in the art. However, preferably the encoding provides a highly fault tolerant form of encoding to tolerate errors that may arise due to use and handling of the print media. The encoding format can be, for example, Reed-Solomon encoding of the data to provide for a high degree of fault tolerance.

Turning to FIG. 4, when it is desired to "play back" the recorded audio, the photo 17 is passed through a reader device 26 which includes pinch rollers for guiding the photo 17 past a magnetic sensor device 27.

Figure 5:
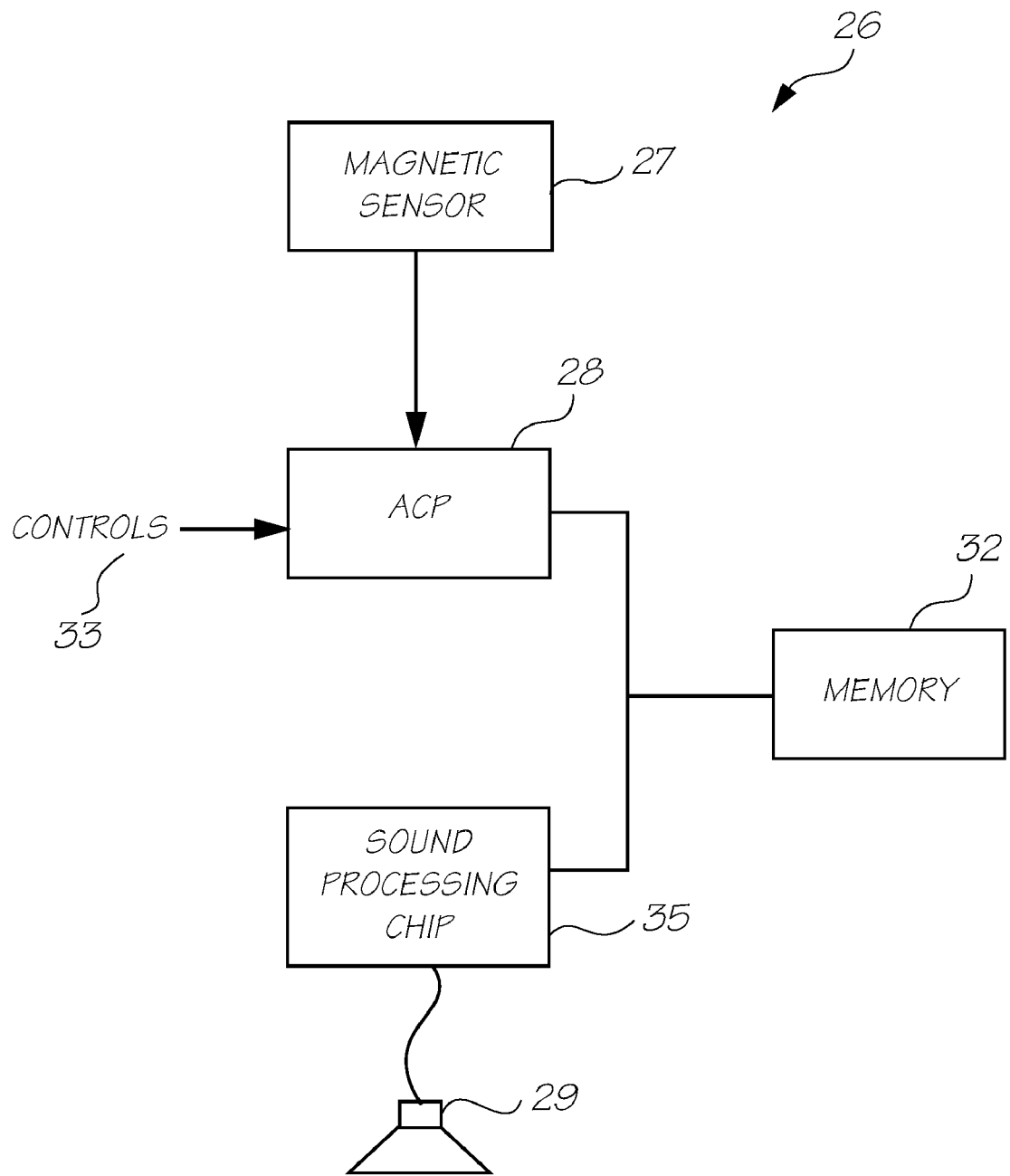
FIG. 5 illustrates the utilization of an apparatus of the preferred embodiment.

Referring now to FIG. 5, there is illustrated in schematic form the operation of the audio reader device 26 of FIG. 5. The magnetic sensor 27 is interconnected to a second Artcam central processor (ACP) 28 which is suitably adapted to read and decode the data stored on the back of the photograph. The decoded audio information is stored in memory 32 for playback via a sound processing chip 35 on speaker 29. The sound processing chip 35 can operate under the control of the ACP decoder 28 which in turn operates under the control of various user input controls 33 which can include volume controls, rewind, play and fast forward controls etc.

It can be seen from the foregoing description of the preferred embodiment that there is provided a system for the automatic recording of audio associated with an output image so as to provide an audio record associated with a photograph printed on ink jet media. There is also disclosed an audio reader system for reading an image recorded on the back of such a photograph.

It would be appreciated by a person skilled in the art that numerous variations and/or modifications any be made to the present invention as shown in the specific embodiment without departing from the spirit or scope of the invention as broadly described. For example, the utilisation of more complex audio recording and playback techniques such as stereo and B-format techniques. The present embodiment is, therefore, to be considered in all respects to be illustrative and not restrictive.

Ink Jet Technologies

The embodiments of the invention use an ink jet printer type device. Of course many different devices could be used. However presently popular ink jet printing technologies are unlikely to be suitable.

The most significant problem with thermal ink jet is power consumption. This is approximately 100 times that required for high speed, and stems from the energy-inefficient means of drop ejection. This involves the rapid boiling of water to produce a vapor bubble which expels the ink. Water has a very high heat capacity, and must be superheated in thermal ink jet applications. This leads to an efficiency of around 0.02%, from electricity input to drop momentum (and increased surface area) out.

The most significant problem with piezoelectric ink jet is size and cost. Piezoelectric crystals have a very small deflection at reasonable drive voltages, and therefore require a large area for each nozzle. Also, each piezoelectric actuator must be connected to its drive circuit on a separate substrate. This is not a significant problem at the current limit of around 300 nozzles per print head, but is a major impediment to the fabrication of pagewide print heads with 19,200 nozzles.

Ideally, the ink jet technologies used meet the stringent requirements of in-camera digital color printing and other high quality, high speed, low cost printing applications. To meet the requirements of digital photography, new ink jet technologies have been created. The target features include:

low power (less than 10 Watts)
high resolution capability (1,600 dpi or more)
photographic quality output
low manufacturing cost
small size (pagewidth times minimum cross section)
high speed (<2 seconds per page).

All of these features can be met or exceeded by the ink jet systems described below with differing levels of difficulty. 45 different ink jet technologies have been developed by the Assignee to give a wide range of choices for high volume manufacture.

For ease of manufacture using standard process equipment, the print head is designed to be a monolithic 0.5 micron CMOS chip with MEMS post processing. For color photographic applications, the print head is 100 mm long, with a width which depends upon the ink jet type. The smallest print head designed is IJ38, which is 0.35 mm wide, giving a chip area of 35 square mm. The print heads each contain 19,200 nozzles plus data and control circuitry.

Ink is supplied to the back of the print head by injection molded plastic ink channels. The molding requires 50 micron features, which can be created using a lithographically micro-machined insert in a standard injection molding tool. Ink flows through holes etched through the wafer to the nozzle chambers fabricated on the front surface of the wafer. The print head is connected to the camera circuitry by tape automated bonding.

I claim:

1. A digital camera system comprising:
a print medium having a first surface delimiting an area in which images are printed, and a second surface pre-treated to be magnetically sensitive;
a photo-width printhead integrated with a digital camera, the photo-width printhead for printing digital images on the first surface of the print medium; and
a magnetic recorder for recording information associated with said digital images on the second surface of the print medium at the same time the printhead prints the digital images onto the printing area.

2. The digital camera system of claim 1, wherein the associated information comprises audio information associated with the digital image.

3. The digital camera system of claim 2, further comprising a microphone integrated with the digital camera, the microphone for recording the audio information associated with the digital image.

4. A digital camera as claimed in claim 1, wherein the first surface and the second surface are on opposite faces of the print medium.

* * * * *